Figure 1:
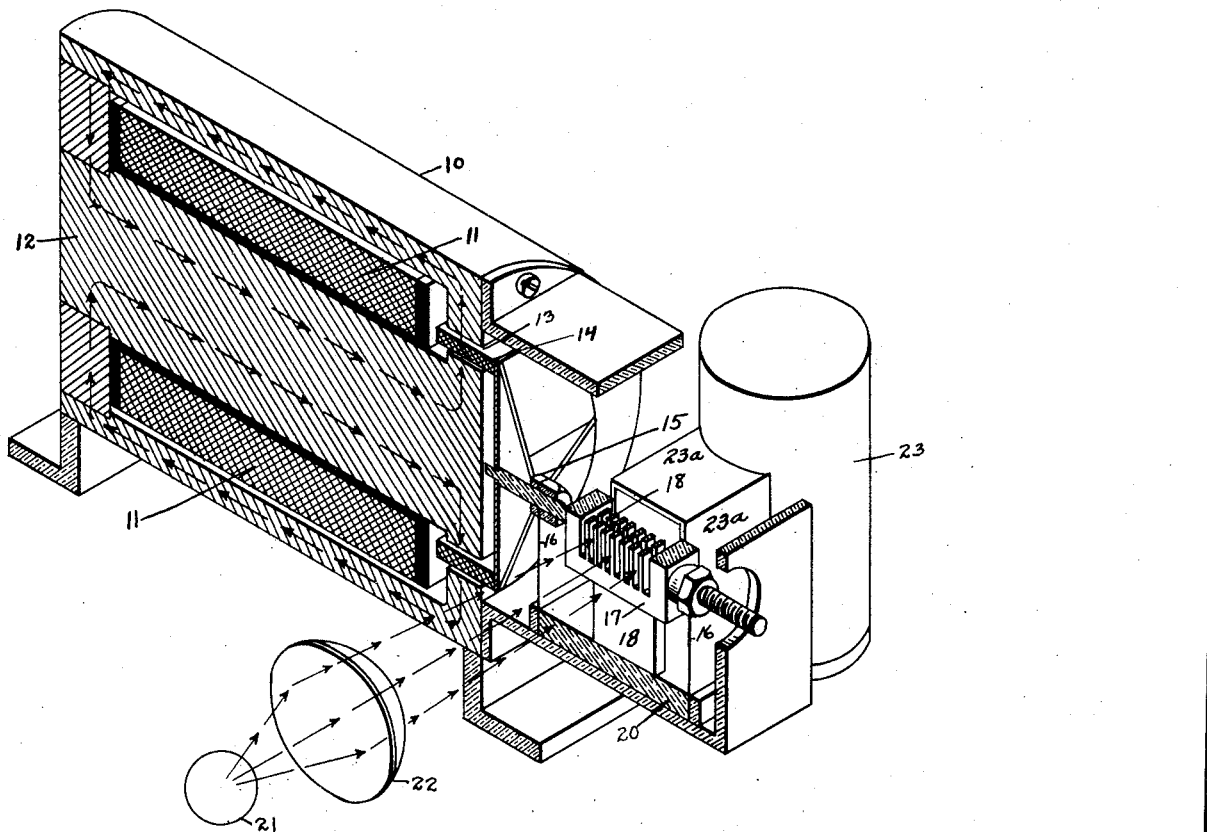

Dec. 27, 1938.　　　S. E. DAWSON　　　2,141,175
DISTANT READING ELECTROMAGNETIC BALANCE
Filed March 2, 1934　　　2 Sheets-Sheet 1

INVENTOR
Samuel E. Dawson
BY
ATTORNEY

Dec. 27, 1938.  S. E. DAWSON  2,141,175
DISTANT READING ELECTROMAGNETIC BALANCE
Filed March 2, 1934  2 Sheets-Sheet 2

INVENTOR
Samuel E. Dawson.
BY
ATTORNEY

Patented Dec. 27, 1938

2,141,175

UNITED STATES PATENT OFFICE 2,141,175

DISTANT READING ELECTROMAGNETIC BALANCE

Samuel E. Dawson, Washington, D. C.

Application March 2, 1934, Serial No. 713,761

5 Claims. (Cl. 177—351)

(Granted under the act of March 3, 1883, as amended April 30, 1928; 370 O. G. 757)

This invention relates to automatically controlled distant reading electro-magnetic balances and has, as an object, the accurate measurement of forces at an inaccessible or distant point.

My invention comprises an improved method of and apparatus for weighing articles of varying mass for measuring variable forces with practical unvarying accuracy and sensitiveness throughout long periods of extensive use although the apparatus by which the method may be practised may be conveniently portable.

Weighing methods and apparatus which lack precision and sensitiveness and may not comply with the high requirements of unvarying accuracy and sensitiveness long established by commerce and the penal laws are worse than useless and promotive of obliquity and fraud.

An object of my invention is to provide a method of and apparatus for weighing which may accurately indicate the weight or force measured at a point distant from the weight or force measured and which weight or force may not be conveniently accessible to the person performing or controlling the weighing or measuring operation.

Another object of my invention is to provide an improved electro-magnetic balance which may accurately measure throughout long periods of arduous service the amount of energy of widely variable forces or the mass of widely variable weights.

Another object of my invention is to provide an electro-magnetic balance in a self-contained, compact, readily portable, highly accurate and long enduring mechanism forming a part of an electric circuit.

Another object of this invention is to permit the reading and recording of several relatively widely variable forces acting simultaneously where it would be inconvenient or impossible to maintain equilibrium or to take readings on several balances of the usual type embodying weights or springs.

A further object of this invention is to provide an automatically controlled distant reading electro-magnetic balance having a high ratio of effective pull to weight and practically free from external electrical, magnetic or other variable influences including inherent friction.

A still further object of this invention is to provide an electromagnetic balance capable of sensitive accuracy even when functioning while submerged in water or other liquids or gases.

Other objects of the invention will appear more fully hereinafter.

The invention consists substantially in the construction, combination, location, and relative arrangement of parts, all as will be more fully hereinafter set forth, as shown in the accompanying drawings, and finally pointed out in the appended claims.

Figure 2:
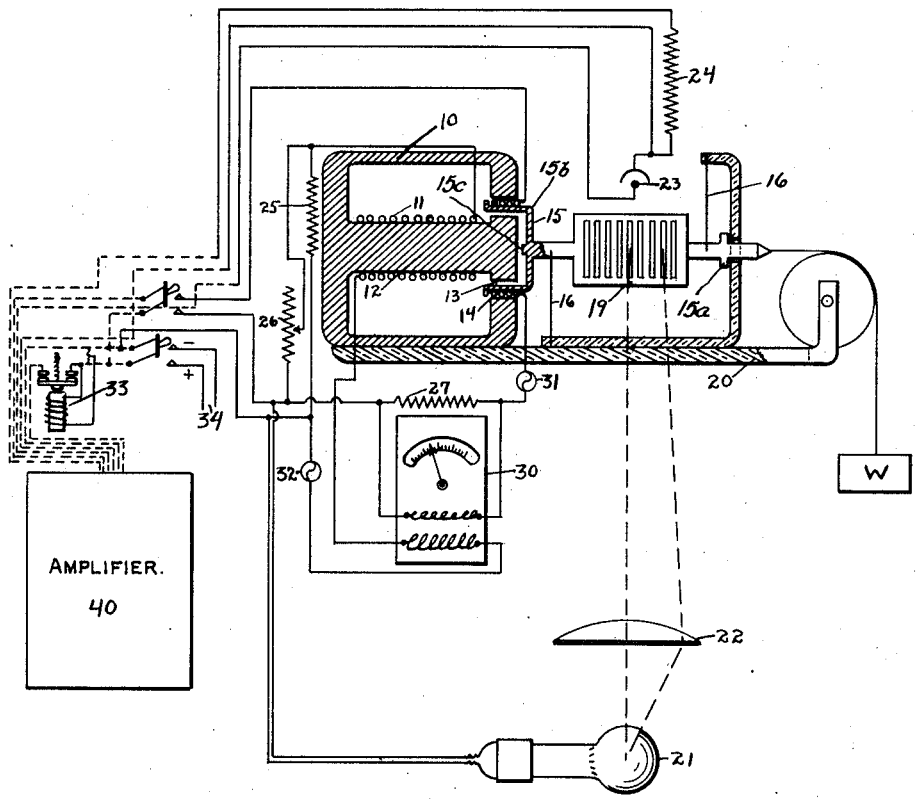

Reference is to be had to the accompanying drawings forming a part of this specification, in which like reference characters indicate corresponding parts throughout the several views, and in which:

Fig. 1 is a view in perspective partially in section of the operative element of my invention and, Fig. 2 is a side elevation of the operative element together with a diagrammatic showing of its associated electrical circuits.

It is customary, in the testing of models of various kinds, to measure forces by certain well-known combinations of weights, springs and levers. Equilibrium is maintained by manual shifting of weights or adjustment of springs. Forces are then read off directly, at the apparatus, by observers. There are many variations of these practices, some of them semi- or fully automatic, made possible by recent developments, in the design of these instruments. The mechanical types usually have heavy beams and sliding weights which operate satisfactorily as fixed installations but are objectionable in that they do not possess a desirable mobility nor are they capable of indicating or recording rapid fluctuations of force. Such types are also incapable of accurately indicating relatively small weights or increments of force throughout a substantial range or capacity.

Modern research has demanded some type of distant-reading or distant controlled balance which shall be capable of applying the reaction to a given force in a location not accessible to an observer or under conditions where ordinary manual control of measuring apparatus would be impossible. Modern testing methods demand likewise a precision which requires that the effect of extraneous as well as inherent influences upon and of such a device be reduced to a negligible amount. To meet this demand, certain pressure operated types of instruments working in conjunction with manometers or gauges have been developed as have also certain electrical instruments, embodying in some shape or form, the simple electro-magnet, usually of the plunger type. These pressure operated and electrical devices, however, suffer from the disadvantages that equilibrium at the distant point cannot always be assured and that the apparatus is not suited for accurate work on moving objects.

With the objects previously mentioned and the limitations of the prior art in view, the automatically controlled distant-reading electromagnetic balance about to be described was devised to meet the longstanding needs of engineering research which many have heretofore vainly sought to supply.

The balance proper consists essentially of two elements: an electro-magnetic device 10 which may exert a variable reaction to oppose the force W that may be substantially varied and which is applied to the balance, and a control device which maintains the balance automatically in equilibrium by adjusting the reaction, instantaneously and exactly, to correspond to the force applied with only a slight substantially constant frictional load thereon insufficient to detract from the accuracy of even quite delicate weighings. A wattmeter 30, which may or may not be recording, is used to indicate, either in watts or directly in units of weight, the magnitude of the widely variable force that may be applied.

The electromagnetic device 10 consists of a solenoid 11 with a core of magnetic material 12 producing a magnetic field in an air gap 13 in which there is mounted, by being wound about the periphery of a disc 15, a wire coil 14 of suitable shape, dimensions, and characteristics. This wire coil is mounted by suitable mechanical means 15 on a pair of flexible parallel springs 16, or other equivalent mounting, so that the coil may move back and forth in the magnetic field of the air gap, in a direction generally perpendicular to the lines of force, with negligible restraint and great accuracy and sensitiveness. The moving wire coil 14 in conjunction with its movable mounting 15 and 16 and associated parts will hereinafter be termed the active element.

When the solenoid 11 is energized by a current, a powerful magnetic field is set up in the air gap 13 of a potency proportionate to such current. Upon a current being then passed through the moving coil 14, the conductors of this coil are acted on by a force parallel to the direction of its axis, in the line of the external force W applied to the balance but in the opposite direction. If the current in the solenoid 11 is constant, or the lines of force in the air gap 13 are constant, the current in the moving coil 14, required to maintain the equilibrium of the balance, is proportional to the externally applied force W. The magnitude of the current in moving coil 14 is a measure of the force applied and by adjusting the current in coil 14 automatically, the force tending to keep coil 14 within the magnetic field of air gap 13 can be kept sensibly equal to the applied external force W, thus maintaining the balance in equilibrium.

Since the current in the moving coil 14 of the active element is everywhere the same throughout the circuit in which it flows, its strength may be measured at any point in said circuit, however distant from the active element. Since the coil current is regulated by the voltage applied to this circuit and its total resistance, and since the voltage may be increased with the resistance to maintain the current constant in value under a certain reference condition of the balance, say "no load", changes in temperature of the leads, varying contact resistance, and other similar factors do not affect the accuracy of the instrument.

This type of balance operates under the inherent disadvantage that the indicating current cannot be used as a direct measure of the force exerted unless the supply voltage to the main solenoid 11 be held constant. Variations in this voltage will cause corresponding variations in the energizing current, in the flux across the air gap 13, and hence in the force exerted upon the active element, assuming a constant indicating current in the moving coil 14. However, as the flux varies closely as the impressed voltage on the main solenoid 11, indications of force applied to the balance may be registered with accuracy by the use of a wattmeter 30 which carries the main solenoid 11 supply voltage and the indicating current of moving coil 14 in its respective coils. It is understood that the wattmeter 30 instead of indicating watts, may be calibrated to read directly in pounds, ounces, or other indication of weight or force. Combinations of resistances, potentiometers, and ammeters may also be used for this purpose, either sight indicating or some preferred type of recording instrument.

If the balance is to remain in equilibrium under the influence of fluctuating loads, the indicating current must fluctuate directly in proportion with the load. It is obvious that with rapid fluctuations, manual control would become increasingly difficult with an increase in the rapidity of fluctuation until a point would soon be reached where manual control would be impracticable, if not impossible. To meet this problem, automatic control of the indicating current through the moving coil 14 is supplied and effected by mounting on the active element one half 17 of a grid type shutter 19; the other half 18 of the grid type shutter 19 is fixed to the frame 20 of the apparatus. As the active element moves back and forth on its flexible practically frictionless spring mounting 16 in the direction of its axis, the shutter is opened and closed. By using the grid type shutter, the total movement may be confined to narrow limits and may be adjusted at will by varying the position of the two halves 17 and 18 of the grid type shutter with relation to each other.

The movement of the active element is restricted within rather narrow limits by the action of stops formed thereon, as shown in Fig. 2. One of these stops consists of a collar 15a formed near one end of the element adjacent the point where it passes through the frame 20. The other consists of a centrally located abutment 15c formed on the other end of the element adjacent the end of core 12.

This limiting of the movement of the active element results in its movement taking place in practically a straight horizontal line throughout only a small arc of bending of the spring supporting elements 16. Throughout this small arc of bending the frictional stresses acting on the active element due to its suspension remain small and practically constant.

The mounting of the active element for limited movement in a horizontal direction has the advantage that the suspension members 16 sustain all the weight thereof so that none of the opposing magnetic force is required to neutralize or counterbalance it, thus releasing all the opposing magnetic force for balancing the force to be measured.

Opposite the grid type shutter 19, on one side, is a source of light 21 and a suitable system of lenses 22 to focus and direct the light upon and through the shutter 19. Opposite the shutter 19, on the other side, is a light sensitive cell 23 acted upon by the varying amounts of light passing through the shutter 19 from light source 21.

The light sensitive cell 23 is connected to the input of a vacuum tube amplifier 40 in such manner that the amount of light impinging upon the light sensitive cell 23 controls the amount of current passing through the moving coil 14 of the active element which is connected in the output circuit of the amplifier. When the force applied to the balance increases, the active element moves and opens the shutter 19, allowing more light to impinge on the light sensitive cell 23. The current through the light sensitive cell 23 is increased and this increased current is amplified by means of amplifier 40 which results in an increased current in the moving coil 14. The increased current in moving coil 14 increases the force exerted by the active element and the balance again regains its equilibrium. Thus the variations of light through the shutter 19 cause corresponding variations in the current delivered by the amplifier 40 to the moving coil 14 which results in the external force applied and the reaction developed in the balance being held automatically in equilibrium.

The electrical connections of the light sensitive cell 23 and grid like resistor 24 across the input of the vacuum tube amplifier 40 is similar to that well known in the prior art as the typical direct current forward photo electric circuit wherein an increase of light at the photocell causes an increase in current across the cell which in turn effectuates an increased current in the amplifier output circuit.

The electrical characteristics of the associated circuits may be so adjusted by means of using various values for resistors 24, 25, 26, and 27 that the balance will respond practically instantaneously to sudden changes in load, even to full range changes from no load to full load and vice versa, without hunting or unnecessary oscillation about the point of equilibrium. Fuses 31 and 32 are provided for the protection of meter 30 and coils 11 and 14. Overvoltage relay 33 is provided to segregate the device from the source of potential 34 which may be any source of direct current at a potential of 110 volts or any other suitable voltage.

This type of balance can be hermetically sealed and adapted to the indication or recording of forces under water, such as when towing models of torpedoes, submarines, and similar objects submerged or it can be fitted with flexible diaphragms and used for indicating or recording the dynamic and hydrostatic pressures of liquids or gases in which it may be immersed. If desired, air gap 13 and the spaces surrounding the movable coil may be filled with an inert gas, a fluid, or a vacuum, or other material having a constant magnetic permeability.

The device described lends itself readily to the measurement of forces at a point remotely located or inaccessible with respect to an operator. The wattmeter 30 may be located in any desirable position remote from the mechanical elements of the balance.

It will be understood that the above description and accompanying drawings comprehend only the general and preferred embodiment of my invention and that various changes in construction, proportion, and arrangement of parts may be made within the scope of the appended claims without sacrificing any of the advantages of my invention.

The invention herein described may be manufactured and used by or for the Government of the United States of America for governmental purposes without the payment of any royalties thereon or therefor.

What I claim as new and desire to secure by Letters Patent of the United States is:—

1. A force-measuring device comprising a support, a constant-field magnet having an annular air-gap carried thereby, a movable, annular coil disposed to move axially within said air-gap, a shaft restricted to motion of small amplitude and connected axially to said movable coil at one end thereof, parallel flexible means between said support and said shaft to permit axial movement of said shaft in such a manner that the weight of said shaft and movable coil will exert no substantial force on said movable coil and tending to so position it that said movable coil will be maintained in a predetermined location axially of said air-gap when the device is in neutral operating position and no force is being measured, a light valve grid mounted on said shaft between said parallel means, a parallel cooperating grid mounted on said support and means for connecting a means exerting a force to be measured axially at the other end of said shaft.

2. A force-measuring device comprising a support, a constant-field magnet having an annular air-gap carried thereby, a movable annular coil disposed to move axially within said air-gap, a shaft restricted to motion of small amplitude and connected axially to said movable coil at one end thereof, parallel flexible, resilient members connecting said support and said shaft to permit axial movement of said shaft in such a manner that the weight of said shaft and said coil will exert no substantial force on said movable coil and tending to so position it that said movable coil will be maintained in a predetermined location axially of said air-gap against the action of external forces tending to move it therefrom, a light valve grid mounted on said shaft between said parallel means, a parallel cooperating grid mounted on said support and means for connecting a means exerting a force to be measured axially at the other end of said shaft.

3. A force-measuring device comprising a support, a constant-field magnet having an annular air-gap carried thereby, a movable, annular coil disposed to move axially within said air-gap, a shaft restricted to motion of small amplitude and connected axially to said movable coil at one end thereof, parallel spring members extending in opposite directions from said shaft to said support to permit axial movement of said shaft in such a manner that the weight of said shaft and movable coil will exert no substantial force on said movable coil and tending to so position it that said movable coil will be maintained in a predetermined location axially of said air-gap when the device is in neutral operating position and no force is being measured, a light valve grid mounted on said shaft between said parallel members, a parallel cooperating grid mounted on said support and means for connecting a means exerting a force to be measured, axially at the other end of said shaft.

4. A force-measuring device comprising a support, a constant-field magnet having an annular air-gap carried thereby, a movable annular coil carrying a variable current and disposed to move axially within said air-gap, a source of potential for said movable coil, a shaft restricted to motion of small amplitude and connected axially to said movable coil at one end thereof, parallel, flexible means between said support and said shaft to permit axial movement of said shaft in such a manner that the weight of said shaft and movable coil will exert no substantial force on said movable coil and tending to so position it that said movable coil will be maintained in a predetermined location axially of said air-gap when the device is in neutral operating position and no force is being measured, a light valve grid mounted on said shaft between said parallel means, a parallel cooperating grid mounted on said support and means for connecting a means exerting a force to be measured axially at the other end of said shaft, a current indicating instrument connected to indicate the current flowing through said movable coil, a light-sensitive cell connected to govern the magnitude of the current flowing in said movable coil, and a light source so positioned that said grids control the amount of light therefrom falling upon said light-sensitive cell.

5. A force-measuring device comprising a support, a constant-field magnet having an annular air-gap carried thereby, a movable annular coil carrying a variable current and disposed to move axially within said air-gap, a source of potential for said movable coil, an element restricted to motion of small amplitude for mechanically connecting said movable coil in opposition to the force to be measured, flexible spring-like members connected to said element at spaced points therealong, and to said support, and bearing the weight of said movable coil and said element and opposing within the limits of movement allowed said element any action by external forces to move said movable coil from a predetermined axial location within said air-gap, a current indicating instrument connected to indicate the current flowing through said movable coil, a light-sensitive cell connected to govern the magnitude of the current flowing in said movable coil, a light source, and a grid-like screen mechanically associated with said element and movable thereby to control the amount of light from said light source falling upon said light-sensitive cell in proportion to the magnitude of the force acting on said connecting element.

SAMUEL E. DAWSON.